B. EITNER.
MEASURING APPARATUS.
APPLICATION FILED SEPT. 12, 1913.
1,154,620.
Patented Sept. 28, 1915.
3 SHEETS—SHEET 1.
Fig. 1.
Fig. 2.
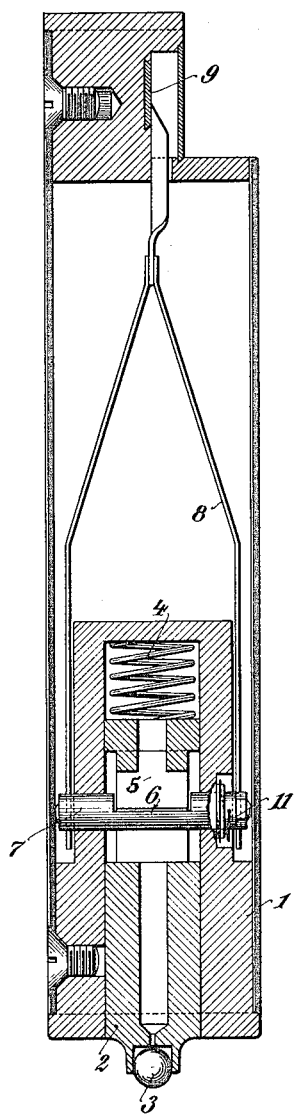
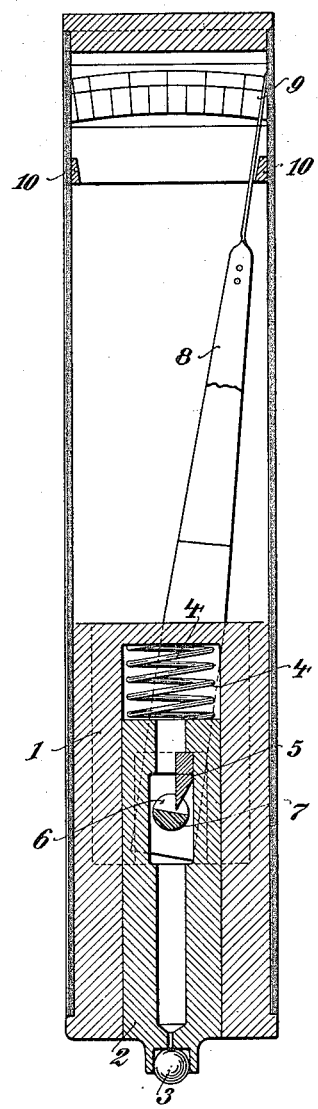
Witnesses:
Fred White
René Ruine
Inventor:
Berthold Eitner,
By Attorneys,
Fraser Turk & Mullen Inventor:
Berthold Eitner,
By Attorneys,

B. EITNER.
MEASURING APPARATUS.
APPLICATION FILED SEPT. 12, 1913.

1,154,620.

Patented Sept. 28, 1915.
3 SHEETS—SHEET 3.

Inventor
Berthold Eitner,
By Attorneys,
Fraser, Dunk & Myers

UNITED STATES PATENT OFFICE.

BERTHOLD EITNER, OF REINICKENDORF, NEAR BERLIN, GERMANY, ASSIGNOR TO DEUTSCHE WAFFEN- UND MUNITIONSFABRIKEN, OF BERLIN, GERMANY.

MEASURING APPARATUS.

1,154,620.

Specification of Letters Patent. Patented Sept. 28, 1915.

Application filed September 12, 1913. Serial No. 789,518.

*To all whom it may concern:*

Be it known that I, BERTHOLD EITNER, workmaster, subject of the German Emperor, residing at No. 65 Scharnweber street, Reinickendorf, near Berlin, Germany, have invented new and useful Improvements in Measuring Apparatus, of which the following is a specification.

This invention relates to a measuring apparatus, which has for its object to accurately measure the dimensions of objects or to compare them with a standard measure. For this purpose, the object to be measured or compared is placed between the measuring apparatus and one or more fixed stops, or around the latter for internal measurements. A pointer provided on the measuring apparatus then indicates whether the object corresponds in the measured dimension with the standard measure or deviates therefrom toward the one or the other side. Measuring apparatus of this kind are known, wherein calipers adjustably mounted in the apparatus and coming in contact with the object to be measured act directly on a lever mechanism, to which a pointer is secured and which is held by a spring in the position of rest and is always returned thereto. Such measuring apparatus have the disadvantage that in the case of great inaccuracies of the objects to be measured, the lever mechanism is subjected to great vibrations or shocks, which give rise to a rapid wear and tear of the contacting surfaces of the lever mechanism and a twisting or breakage of the pointer coming in violent contact with the limiting stop. This drawback is obviated by the present invention in that the calipers do not act directly on the lever mechanism but on the spring holding the pointer in the position of rest, so that the pointer can be relieved of the pressure of this spring and oscillated by a second, weaker spring. Thus only these two springs act on the lever mechanism and the pointer, so that the forces exerted on these parts are always independent of the pressure exerted on the calipers. As these springs need not be strong, these forces are very slight, so that a great wear and tear, twisting or breakage of the parts need not be feared.

The invention is shown in the accompanying drawing by way of example.

Figure 3:
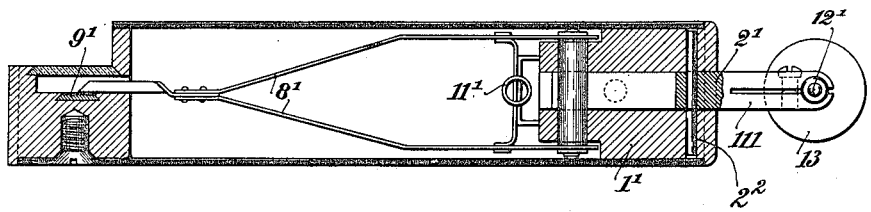
Figure 4:
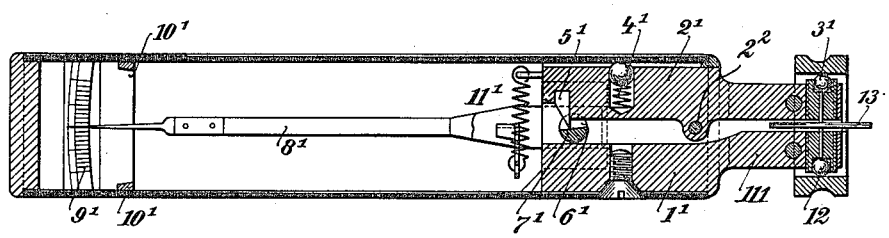
Figure 5:
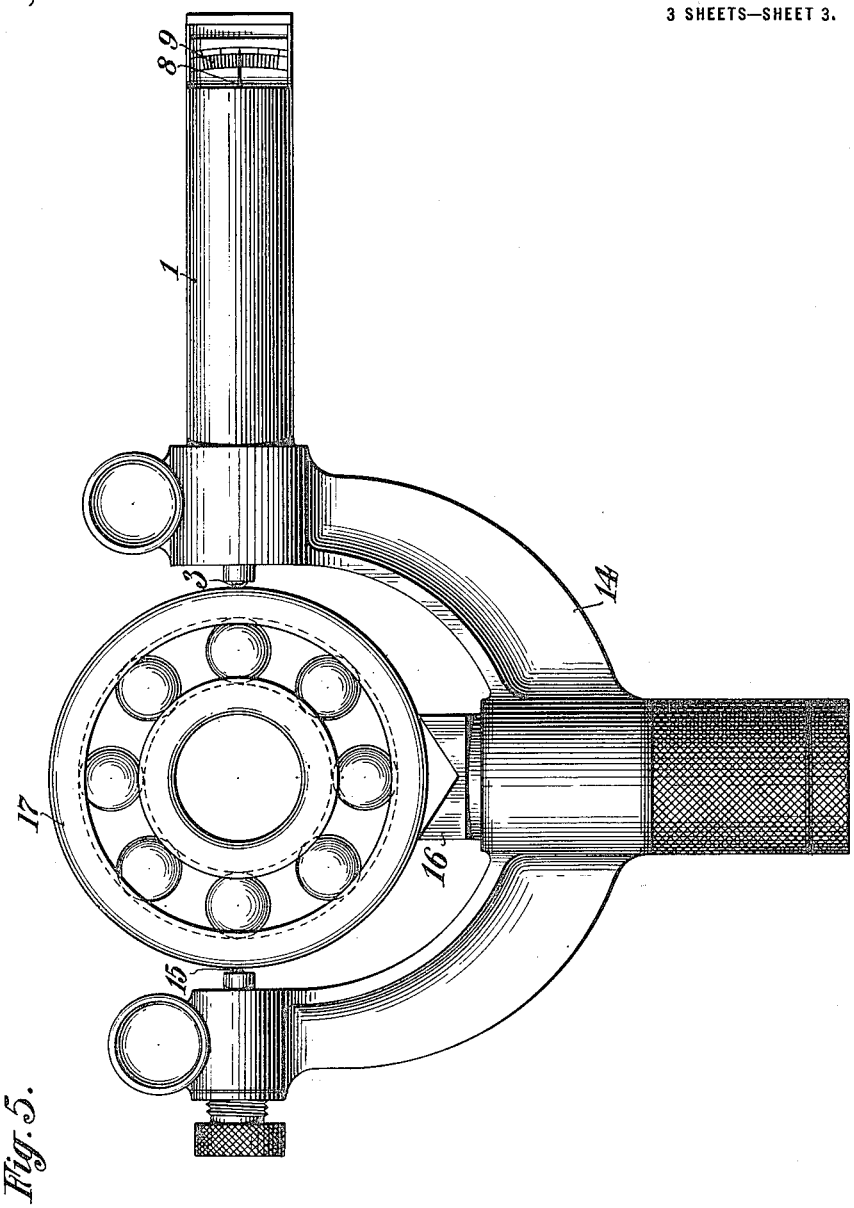

Figures 1 and 2 show two longitudinal sections at right angles to each other through a measuring apparatus made according to this invention. Figs. 3 and 4 are two corresponding longitudinal sections through another modification of such an apparatus; and Fig. 5 is an elevational view, illustrating the way in which the device shown in Figs. 1 and 2 is used.

In the example according to Figs. 1 and 2, the calipers 2 are adapted to move longitudinally in a casing 1 and a hardened and polished ball 3 is adapted to be readily interchanged in the outer end of the calipers. There is provided between the calipers and the bottom of the casing a spring 4, which tends to force the calipers outwardly. A cutting or knife edge 5 is provided in an inner recess of the calipers and bears on a plane surface 6 of a shaft 7 mounted vertically to the longitudinal axis of the calipers. This surface 6 extends through the axis of the shaft 7 and the cutting edge 5 bears on the surface close to the axis of the shaft. There is secured on the shaft 7 a two-armed pointer 8, which moves over a scale 9 and is limited in its movement by stops 10. A spring 11 secured to the casing 1 engages with the shaft 7. This spring is weaker than the spring 4 and tends to rotate the shaft and the pointer in the direction which is opposite to that in which the spring 4 through the medium of the calipers 2 and the knife edge 5 tends to rotate the shaft 7 and the pointer.

The apparatus is placed opposite one or more fixed or adjustable stops in a holder and so secured therein that the pointer 8 oscillates to a certain division of the scale 9, for example, to the middle one, when the standard measure, with which the object to be measured is to be compared with respect to its dimensions, is placed between the stops and the ball 3 of the apparatus. If instead of this standard measure the object to be measured is placed between the stops and the ball of the calipers, the pointer 8 indicates whether the respective dimension of this object corresponds with that of the normal measure or not. In the former case, the pointer will be again on the middle division of the scale; if the respective dimension in respect of the object is larger than in connection with the standard measure, the pointer will be on the left (Fig. 2) beside this division, otherwise on the right thereof.

The action of the standard measure and the object to be measured on the pointer takes place in the following manner. In the position of rest, the spring 4 while overcoming the counteracting but weaker spring 11 forces the calipers 2 and the knife edge 5 outward, so that the latter holds the shaft 7 and the pointer 8 in the right (Fig. 2) end position. If, however, the object to be measured or the standard measure bears on the ball 3 of the calipers, the calipers 2 will be pushed inward by the pressure exerted thereon and on the compression of the spring 4, whereupon the cutting edge 5 recedes from the surface 6 of the shaft 7, so that the latter can be rotated with the pointer 8 by the spring 11 to the left (Fig. 2). The extent of the movement of the calipers 2 out of the position of rest (Fig. 2) inwardly will thus be indicated by the pointer 8 on the scale 9. If the objects compared with one another are different in the dimensions lying between the fixed stop or stops and the ball of the calipers, there will be a difference between the inward movement of the calipers and the oscillations of the pointer, so that the difference of the oscillations of the pointer will indicate on an enlarged scale the difference of the compared dimensions of the objects.

The measuring apparatus, above-described, is useful in many employments, one of which is illustrated in Fig. 5. The measuring apparatus is shown mounted in a jaw gage 14, having two adjustable stops 15 and 16. The subject of the measurement in the illustration, the outer ring 17 of a ball bearing, is placed between these stops and the ball 3 of the measuring apparatus.

The modification of the invention as shown in Figs. 3 and 4 is adapted for internal measurements, for example, of rings. It differs from the first described apparatus in that the calipers $2^1$ are not adapted to be moved longitudinally and are combined with a fixed stop 111 formed opposite thereto on the casing, a ball 12 being also removably mounted in the calipers. The construction and operation of this apparatus are otherwise the same as in connection with the first described apparatus. Between the fixed stop 111 and the lever $2^1$, pivoted at $2^2$, is pivoted a disk 13, which represents two further fixed stops, whose connecting line lies vertically to that of the outermost points of the points of the balls $3^1$, 12, so that when measuring a ring, these balls always lie in a diameter of the ring.

I claim:—

1. In a measuring apparatus, the combination with a pointer, a shaft carrying the pointer, said shaft being provided with a plane face, calipers movably mounted relatively to said shaft and having an engaging member provided with a knife edge resting upon said face, a spring for moving the pointer in one direction, and a stronger spring operative upon the calipers for extending the same and moving the pointer in the opposite direction.

2. In a device of the character specified, the combination with a pointer, spring means for moving the pointer toward one limit of its movement, a shaft carrying the pointer and provided with a plane face, calipers movable relatively to said shaft, an engaging member controlled by said calipers and provided with a knife edge resting upon said plane face, and spring means stronger than the pointer spring operative upon and associated with the said calipers and said knife edge for extending the calipers and moving the pointer against the action of its spring.

3. In a device of the character specified, the combination with a pointer, a shaft carrying the pointer, said shaft being provided with a plane face extending through the axis of the shaft, an extensible member provided with a knife edge for engaging said plane face laterally of the axis of the shaft and moving the pointer in one direction upon the extension of such member, a spring for moving the pointer in the opposite direction and a stronger spring for extending said extensible member.

In witness whereof, I have hereunto signed my name in the presence of two subscribing witnesses.

BERTHOLD EITNER.

Witnesses:
 HENRY HASPER,
 WOLDEMAR HAUPT.